(12) United States Patent
Wright

(10) Patent No.: US 6,990,769 B2
(45) Date of Patent: Jan. 31, 2006

(54) ASSEMBLY AND METHOD FOR TERMITE GROUND MONITORING

(76) Inventor: Joseph T. Wright, 949 S. Glendale, Ste 326, Wichita, KS (US) 67218

( * ) Notice: Subject to any disclaimer, the term of this patent is extended or adjusted under 35 U.S.C. 154(b) by 0 days.

(21) Appl. No.: 10/911,450

(22) Filed: Aug. 4, 2004

(65) Prior Publication Data

US 2005/0005505 A1 Jan. 13, 2005

Related U.S. Application Data

(62) Division of application No. 10/435,724, filed on May 8, 2003, now Pat. No. 6,813,858.

(51) Int. Cl.
*A01M 1/02* (2006.01)
*A01M 1/20* (2006.01)

(52) U.S. Cl. ........................ 43/132.1; 43/131
(58) Field of Classification Search ............... 43/132.1, 43/131, 124
See application file for complete search history.

(56) References Cited

U.S. PATENT DOCUMENTS

| | | | | |
|---|---|---|---|---|
| 3,624,953 A | * | 12/1971 | Crosby | 43/131 |
| 5,329,726 A | * | 7/1994 | Thorne et al. | 43/131 |
| 5,555,672 A | * | 9/1996 | Thorne et al. | 43/131 |
| 5,749,168 A | * | 5/1998 | Chrysanthis | 43/131 |
| 5,870,847 A | * | 2/1999 | Hsiao | 43/124 |
| 5,901,496 A | * | 5/1999 | Woodruff | 43/131 |
| 6,003,266 A | * | 12/1999 | Woodruff | 43/131 |
| 6,016,625 A | * | 1/2000 | Bishoff et al. | 43/132.1 |
| 6,079,150 A | * | 6/2000 | Setikas et al. | 43/132.1 |
| 6,219,961 B1 | * | 4/2001 | Ballard et al. | 43/131 |
| 6,370,811 B1 | * | 4/2002 | Masterson | 43/132.1 |
| 6,389,741 B2 | * | 5/2002 | Nimocks, III | 43/131 |
| 6,397,516 B1 | * | 6/2002 | Su | 43/132.1 |
| 6,474,015 B1 | * | 11/2002 | Lund et al. | 43/131 |
| 6,543,182 B2 | * | 4/2003 | Snell et al. | 43/132.1 |
| 6,631,583 B2 | * | 10/2003 | Rollins | 43/132.1 |
| 6,672,000 B2 | * | 1/2004 | Aesch, Jr. | 43/132.1 |
| 6,716,421 B2 | * | 4/2004 | Brode et al. | 43/132.1 |
| 6,724,312 B1 | * | 4/2004 | Barber et al. | 43/132.1 |
| 6,729,067 B2 | * | 5/2004 | Lund et al. | 43/131 |
| 6,772,557 B2 | * | 8/2004 | Laskey et al. | 43/124 |
| 2001/0009399 A1 | * | 7/2001 | Barber et al. | 43/132.1 |
| 2002/0046483 A1 | * | 4/2002 | Snell et al. | 43/131 |
| 2002/0148157 A1 | * | 10/2002 | Rollins | 43/132.1 |
| 2003/0014906 A1 | * | 1/2003 | Roe | 43/132.1 |

(Continued)

FOREIGN PATENT DOCUMENTS

EP 1462001 A1 * 9/2004

(Continued)

*Primary Examiner*—Darren W. Ark
(74) *Attorney, Agent, or Firm*—Kenneth H. Jack; Davis & Jack, L.L.C.

(57) ABSTRACT

An assembly and method for termite ground monitoring, the assembly including an upwardly opening cylindrical housing defining an interior space; a removable lid having a flanged upper surface; a bait stick cradle fitted for downward extension into the interior space; and cradle suspending ties interconnecting the lid and the bait stick cradle; the method including steps of burying the cylindrical housing within the ground so that the interior space opens upwardly; inserting a bait stick into the bait stick cradle; inserting the bait stick cradle into the interior space; providing an extension arm having a slotted lower end; downwardly extending the extension arm toward the lid, and engaging the slot with the lid's flange; and upwardly retracting the extension arm, the lid, the bait stick cradle, and the bait stick for inspection of the bait stick.

7 Claims, 3 Drawing Sheets

U.S. PATENT DOCUMENTS

2004/0088904 A1 * 5/2004 Laskey et al. ............... 43/124
2004/0187378 A1 * 9/2004 Cink et al. ............... 43/132.1
2004/0200134 A1 * 10/2004 Cink et al. ............... 43/132.1

FOREIGN PATENT DOCUMENTS

| | | | |
|---|---|---|---|
| JP | 9-172934 B1 * | 7/1997 | |
| JP | 2002-315493 B1 * | 10/2002 | |
| JP | 2003-144029 B1 * | 5/2003 | |
| JP | 2003-304790 B1 * | 10/2003 | |
| JP | 2004-33177 B1 * | 2/2004 | |
| JP | 2004-290194 B1 * | 10/2004 | |
| WO | WO-98/46071 A1 * | 10/1998 | |

* cited by examiner

ASSEMBLY AND METHOD FOR TERMITE GROUND MONITORING

CROSS REFERENCE TO RELATED APPLICATION AND CLAIM OF PRIORITY

This patent application is a division of U.S. patent application Ser. No. 10/435,724 filed May 8, 2003, now U.S. Pat. No. 6,813,858 and identically titled. In said Ser. No. 10/435,724 application, the Examiner imposed a division restriction, requiring the Applicant to elect between method and apparatus claims. Ongoing prosecution of the apparatus claims was elected in said Ser. No. 10/435,724 application. This Divisional Application is filed prior to patent issuance under application Ser. No. 10/435,724; and only the method claims are presented below.

The Applicant claims priority relating back to the filing of said Ser. No. 10/435,724 application and requests that this Divisional Application be treated as filed on May 8, 2003.

FIELD OF THE INVENTION

This invention relates to methods, apparatus, and assemblies for termite control and extermination. More particularly, this invention relates to such methods and assemblies which include and use ground termite monitoring stations.

BACKGROUND OF THE INVENTION

Commonly known assemblies for termite control through ground monitoring comprise multiple cylindrical housings, each having termite access ports or apertures, a lid for covering the housing, and a wooden bait stick for insertion into and retention within the housing. In use of such assemblies, cylindrical holes are dug within the ground, typically by augering, the holes being positioned around the periphery of a building to be protected. Thereafter, the cylindrical housings are downwardly inserted into the holes, wooden bait sticks are downwardly inserted into the hollow interior spaces of the cylindrical housings, and lids are attached to the housings, covering the bait sticks within the housings' interior spaces. Thereafter, an operator of the system, typically a pest control company employee, periodically returns to the building for inspection of the bait sticks for evidence of termite activity.

A problem or deficiency related to such common termite ground monitoring, baiting, and exterminating systems is that the operator must repeatedly stoop or kneel to ground level for monitoring station installations and for bait stick inspections, resulting in heightened levels of back strain injuries within the pest control company's work force.

The instant inventive assembly and method for termite ground monitoring and baiting solves or ameliorates the problems discussed above by providing ergonomic termite monitoring and baiting station components and method steps which allow for monitoring station installations and bait stick inspections from a standing position and without repeated stooping to ground level.

BRIEF SUMMARY OF THE INVENTION

A primary structural component of the assembly of the instant invention comprises an upwardly opening cylindrical housing having a side wall which defines a hollow interior space. The side wall preferably has a plurality of termite access ports allowing lateral passage of termites from an exterior ground environment, through the access ports, and into the hollow interior space of the cylindrical housing. Also preferably, the cylindrical housing further opens downwardly, facilitating insertion from below of termite bait sticks and further allowing upward access by termites to the interior space defined by the cylindrical housing. While the assembly of the instant invention may suitably comprise as few as a single or a first rendition of such cylindrical housing, the assembly preferably comprises a plurality of second similarly configured housings, the plurality being of a number sufficient for even intermittent spacing within the ground around the periphery of a building to be protected by the monitoring system.

A further structural component of the assembly of the instant invention comprises a lid which is fitted for covering the upper opening of the cylindrical housing. Preferably, removable lid attaching means are provided for removably connecting the lid to the cylindrical housing. Preferably, such removable lid attaching means is molded integrally with the lid and integrally with the upper lip of the cylindrical housing, such means preferably comprising a rotating slotted flange and "L" hook combination. Suitably, other removable attaching means may be utilized such as snap ridge and snap channel combinations, snap lug and snap apertures combinations, intermeshing helical threads, mechanical latches, velour crochet pads, and adhesive pads. Numerous other commonly known removable attaching means may similarly be suitably substituted for the preferred "L" hook and rotating slotted flange combination. Where the preferred plurality of cylindrical housings is provided, a matching plurality of lids is similarly provided, the removable lid attaching means further interconnecting the multiple lids and the multiple cylindrical housings.

A further structural component of the assembly of the instant invention comprises a bait stick cradle. Necessarily, the bait stick cradle is fitted for downward insertion into the interior space of the cylindrical housing. Preferably, the bait stick cradle has a removable floor and preferably, floor attaching means are provided, such means being adapted for removably connecting the floor to the bait stick cradle. Where the assembly comprises a removable floor and floor attaching means combination, removal of the floor allows a termite bait stick to be inserted upwardly into the bait stick cradle. Regardless of the removability of the floor of the cradle, the floor preferably partially closes the lower end of the bait stick cradle, allowing downward drainage of water and upward termite bait stick access. Preferably, the floor of the bait stick cradle comprises a plastic dowel, and preferably the floor attaching means comprises dowel receiving snap channels or "C" channels which are molded into the lower ends of the walls of the bait stick cradle, such channels holding the dowel in a position spanning across the lower end of the bait stick cradle. Suitably, the preferably removable bait stick cradle floor may alternately comprise an apertured disk or plate and the floor attaching means may alternately comprise removable attaching means similar to those described above for attaching the lid to the upper end of the cylindrical housing. Where the inventive assembly comprises, as preferred, pluralities of cylindrical housings and lids, a plurality of bait stick cradles with attachable and detachable floors is preferably similarly provided.

Means for suspending and downwardly extending the bait stick cradle below and from the lid are necessarily provided, such means preferably comprising at least a first, and preferably a pair of rigid ties interconnecting the bait stick cradle and the lid. Other means for suspending and downwardly extending the bait stick cradle below the lid, such as flexible cords, chains, or ties may be suitably substituted for the preferred rigid ties.

A further preferred component of the assembly of the instant invention preferably comprises an extension arm, preferably having a length equal to the waist height of a system operator. Preferably, the extension arm comprises an upper handle means such as a "T" handle or knob, and the lower end of the extension arm necessarily forms extension arm attaching means adapted for successive removable attachments to the lids described above. Preferably, the extension arm attaching means comprises, in combination with structure integral with the upper surfaces of the lids, a friction slot and friction tab or flange combination. Other removable attaching means such as snap channel and snap ridge combinations, snap lug, and snap aperture combinations, intermeshing helical threads, and key and key aperture combinations may be suitably alternately utilized as the extension arm attaching means. Numerous other commonly known removable attaching means may be also suitably substituted.

According to the method of the instant invention, and assuming that a plurality of monitoring station assemblies as described above are provided, cylindrical holes are augered peripherally around a building to be protected by the system. Preferably, an augering machine of the type which is operable from a standing position is utilized for augering such holes, and preferably, the holes are fitted for receiving the outside diameters and vertical heights of the cylindrical housings.

Prior to or following the monitoring station holes augering steps, termite monitoring stations, including components configured as described above, are assembled to include a termite bait stick carried by a bait stick cradle suspended from a lid, the cradle and bait stick assembly extending downwardly from the lid and into the hollow interior space of the cylindrical housing. In such configuration, the lid attaching means preferably holds the lid upon the cylindrical housing, and holds the bait stick cradle and bait stick within the cylindrical housing's interior space. Following assemblies of such monitoring station components, the cylindrical housings are successively embedded within the ground by inserting them into the monitoring station holes. For prevention of bending or stooping in such insertions steps, the extension arm is preferably utilized for downwardly extending and inserting the assembled monitoring stations into the monitoring station holes.

Typically, the termite monitoring stations are allowed to remain within the ground undisturbed for approximately one month, at which time an operator of the system returns to inspect the bait sticks which are housed within the embedded stations. In order to inspect the bait sticks without stooping or bending, the operator preferably utilizes the extension arm to disengage the lid attaching means of the monitoring stations, and to upwardly retract the lids, bait stick cradles, and carried bait sticks for visual inspections. Thereafter, the extension arm may be utilized for re-assembly of the stations within the ground without stooping to ground level.

Accordingly, objects of the instant inventive assembly and method comprise providing a termite monitoring station having a lid and having a downwardly extending bait stick carrying cradle, such lid facilitating ease of insertion and retrieval of bait sticks.

It is a further object of said invention to provide structure, implements, and method steps integral with or associated with the inventive monitoring station and allowing for bait monitoring station installations and subsequent bait stick inspections without bending or stooping to ground level.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
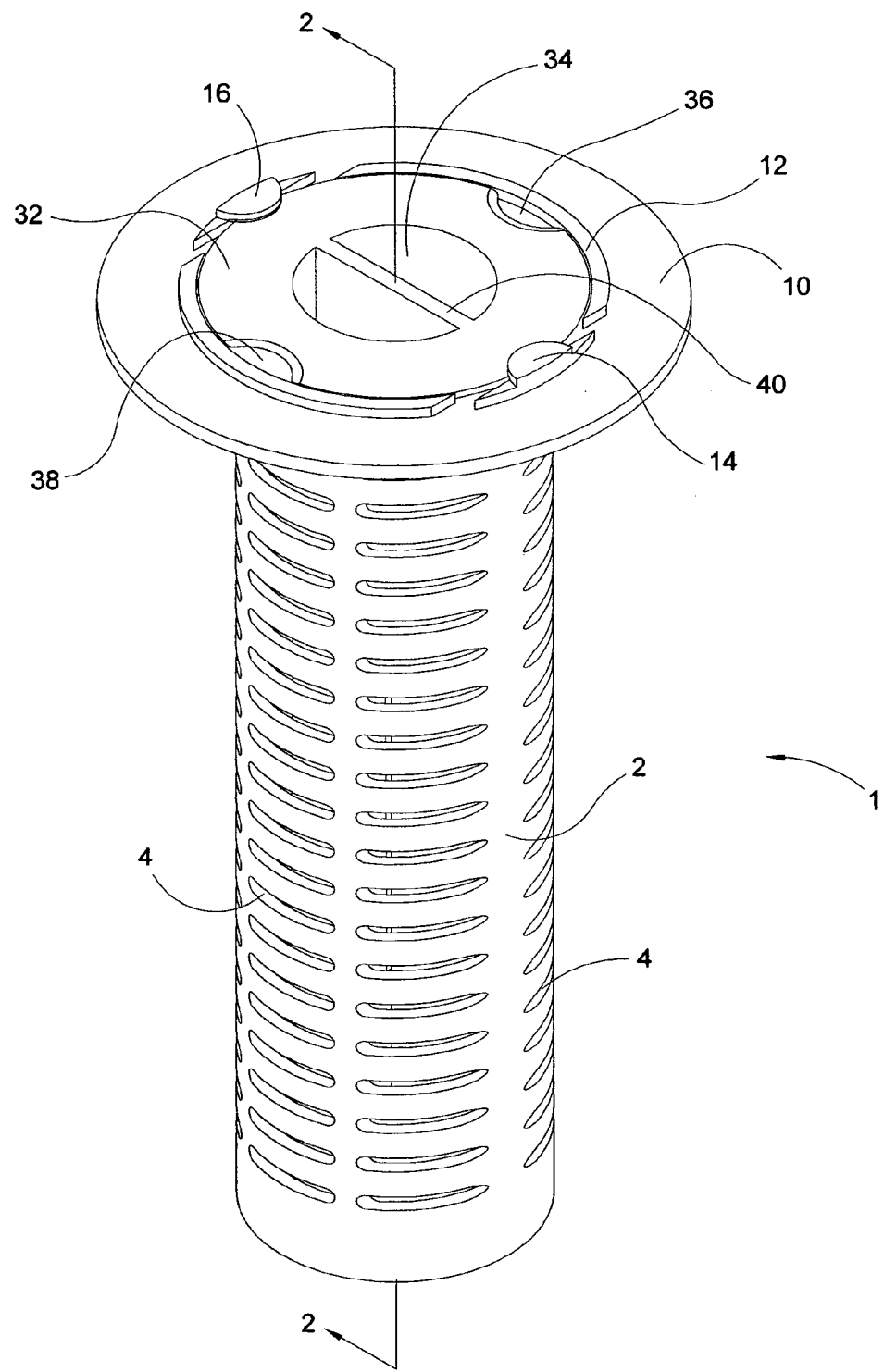
FIG. 1 is an isometric view of the monitoring station of the instant inventive assembly and method.
Figure 2:
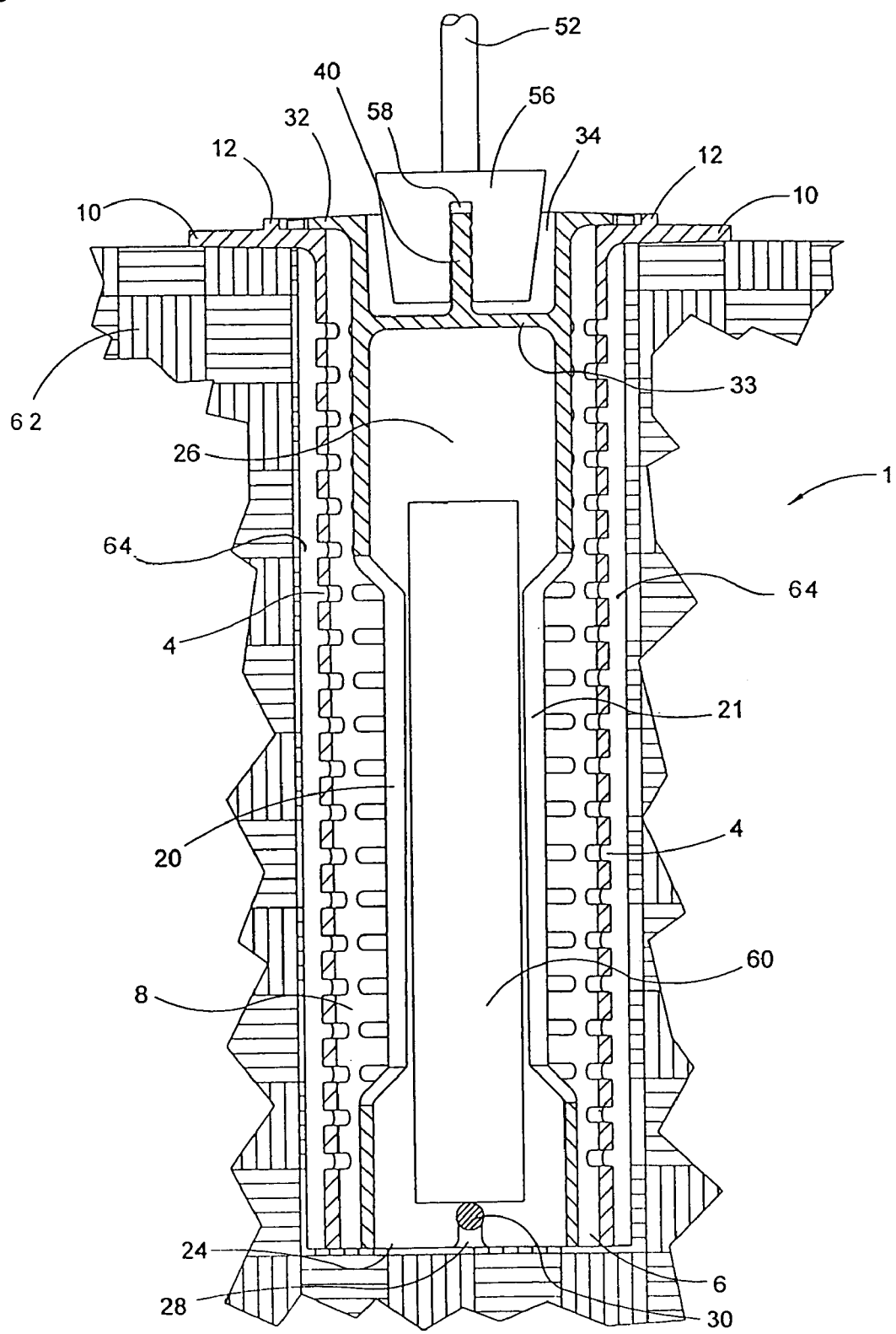
FIG. 2 is a sectional view as indicated in FIG. 1, the view showing the monitoring station embedded within the ground, and the view showing attachment of an extension arm shown in partial view.

Referring now to the drawings, and in particular to FIG. 1, the termite monitoring station of the assembly of the instant invention is referred to generally by Reference Arrow 1. The monitoring station 1 comprises a cylindrical housing 2 having at least a plurality of, and preferably a multiplicity of termite access ports 4. Referring simultaneously to FIGS. 1 and 2, the cylindrical housing 2 preferably has a hollow interior space 8 which opens upwardly and, preferably, has a lower opening 6. The upper lip of the cylindrical housing 2 preferably comprises an outwardly extending annular ground engaging flange 10. The upper surface of flange 10 preferably forms an annular lid receiving and centering ridge 12, said ridge 12 supporting a pair of radially opposed lid retaining "L" hooks 14 and 16.

Figure 3:
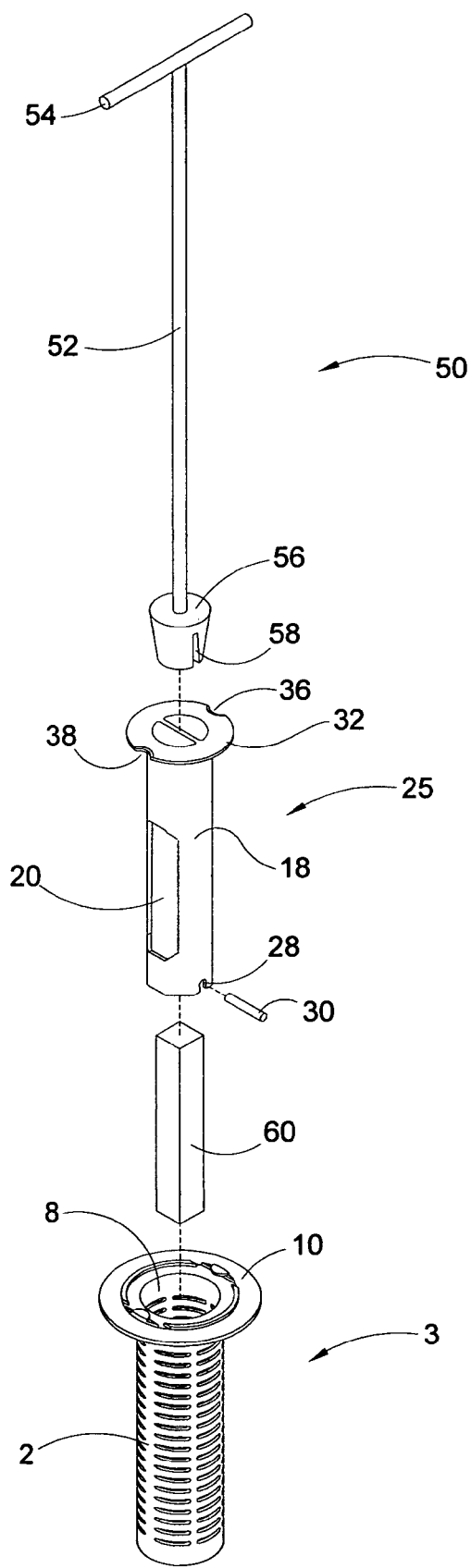
FIG. 3 is an exploded view of the assembly depicted in FIG. 2.

Referring simultaneously to FIGS. 1, 2, and 3, a bait stick cradle and lid combination is referred to generally by Reference Arrow 25, such combination preferably comprising a lid 32, a bait stick cradle 24, and a pair of rigid ties 18 extending downwardly from the lid 32, and interconnecting the bait stick cradle 24 with the lid 32. Preferably, the rigid ties 18 form and define laterally opening termite access ports 20 and 21. Also preferably, upper ends of ties 18 form and define a hollow cylindrical space 26, such space functioning to retain bait stick 60 in its upright position. Also preferably, the lower end of bait stick cradle 24 forms "C" clip channels 28 for receipt of and for removable attachment of a dowel rod 30. The dowel rod 30 serves as a floor of bait stick cradle 24, the dowel rod 30 retaining a bait stick 60 below lid 32, while providing for downward drainage of water, and upward termite access. Preferably, the outside diameter of the lid 32 is fitted for nesting receipt within the inside diameter of ridge 12. Also preferably, the lid 32 is molded to include a cylindrical upwardly opening cavity 34, such cavity 34 having a flange or wall 40 spanning thereacross, the flange or wall 40 serving as a removable attaching means for alternate connection to and detachment from an extension arm which is referred to generally by Reference Arrow 50.

Referring simultaneously to FIGS. 1 and 2, the vertical thickness of lid 32 is slightly less than the vertical height of "L" hooks 14 and 16, allowing lid 32 to slidably rotate beneath "L" hooks 14 and 16. Lid 32 has slots 36 and 38 for alternate engagement and disengagement of lid 32 with and from flange 10. Upon rotation of lid 32 90° from the position depicted in FIG. 1, slots 36 and 38 respectively underlie "L" hooks 14 and 16. In such position, lid 32, along with underlying cradle 24, may be freely inserted into and withdrawn from the interior space 8 of the cylindrical housing 2. Upon rotation of lid 32 to the orientation depicted in FIG. 1, "L" hooks 14 and 16 effectively retain the lid 32 and the underlying cradle 24 within space 8.

Referring simultaneously to FIGS. 2 and 3, extension arm 50 preferably has a shaft 52 having a length equal to waist height, a "T" handle, and an enlarged foot 56, the foot 56 having a slot 58. The dimensions of slot 58 are preferably closely fitted to the dimensions of flange 40, allowing the foot 56 in combination with flange 40 to serve as a removable lid attaching means.

In use of the assembly depicted in FIGS. 1–3, an augering machine (not depicted) is preferably utilized for augering a monitoring station hole 64 within ground material 62. Preferably, such augering machine is operable from a standing position without bending or stooping. Thereafter, or alternately preliminarily, the lid and bait stick cradle combination 25 is secured within cylindrical housing 2, and bait stick 60 is secured within space 26 to rest upon dowel rod 30. In commercial packaging and use of multiple renditions of the monitoring station 1, such station is preferably shipped upside down within a box (not depicted), and in the latched configuration depicted in FIG. 1. In such shipping configuration, lower ends of bait stick cradles 24 are exposed within the opening of such box, allowing an operator to remove dowels 30, insert bait sticks 60 through the opened lower cradle ends, and to replace dowels 30. In such configuration, such box may be held upon a portable waist height working stand in close proximity with monitoring station holes 64 augered within the ground. Thereafter, an operator, while grasping extension arm 50 in one hand, may retrieve from such box with his other hand a termite monitoring station 1. Thereafter, the operator may manually align slot 58 of foot 56 with flange 40, and compressively drive slot 58 over slot 40, connecting the lid and bait stick cradle combination 25, the bait stick 60, and the cylindrical housing 2 to the lower end of the extension arm 50. Thereafter, the operator may release the monitoring station 1, allowing the monitoring station 1 to suspend from the lower end of the extension arm 50. Thereafter, the operator may utilize the extension arm 50 to downwardly extend and direct the monitoring station 1 into the monitoring station hole 64, embedding the monitoring station 1 within the ground without stooping. Thereafter, the operator may place a foot upon exposed upper surfaces of the lid 32 or of the flange 10, and upwardly pull the extension arm 50, disengaging slot 58 from flange 40. Repetition of the procedure described above allows the operator to embed numerous renditions of monitoring station 1 within the ground 62 without bending or stooping to ground level.

Upon departure and subsequent return of the operator to the monitoring station site (typically weeks later), the operator may downwardly extend extension arm 50, aligning slot 58 of foot 56 with flange 40, and downwardly drive slot 58 over flange 40, engaging the lower end of extension arm 50 with lid 32. Thereafter, the operator may rotate "T" handle 54 90°, rotating lid 32 90°, and aligning slots 36 and 38 with "L" hooks 14 and 16. Thereafter, the operator may upwardly raise the extension arm 50 along with the lid and bait stick cradle combination 25, such combination carrying bait stick 60. Upon raising the lid and bait stick cradle combination 25 to eye level, the operator may view the bait stick 60 through port 20 or through 21 to determine whether termites have begun to feed upon bait stick 60. Thereafter, the lid and bait stick cradle combination 25, along with bait stick 60, or a replacement insecticide carrying bait stick (not depicted), may be returned to its original position within cylindrical housing 2, and without stooping, through a reversal of the steps described above. Through repetition of the bait stick inspection procedure described above, an operator may inspect several monitoring stations without stooping or bending to ground level.

While the principles of the invention have been made clear in the above illustrative embodiment, those skilled in the art may make modifications in the structure, arrangement, portions, components, and method steps of the invention without departing from those principles. Accordingly, it is intended that the description and drawings be interpreted as illustrative and not in the limiting sense, and that the invention be given a scope commensurate with the appended claims.

I claim:

1. A method for ergonomic termite ground monitoring comprising the steps of:
    (a) providing at least a first open ended cylindrical housing having a wall defining an interior space, the wall having a plurality of termite access ports;
    (b) embedding the at least first open ended cylindrical housing within the ground so that said housing's interior space opens upwardly from the ground;
    (c) providing at least a first lid, at least a first bait stick, at least a first bait stick cradle, and providing suspending means, the suspending means downwardly extending the at least first bait stick cradle from the at least first lid;
    (d) inserting the at least first bait stick into the at least first bait stick cradle;
    (e) inserting the at least first bait stick cradle downwardly into the interior space;
    (f) providing an extension arm having a lower end, the lower end comprising first attaching means adapted for removably attaching the lower end to the at least first lid, the first attaching means being further adapted for suspending the at least first lid from the extension arm's lower end;
    (g) downwardly extending the extension arm toward the at least first lid, and operating the first attaching means to connect the lower end of the extension arm to the at least first lid;
    (h) upwardly retracting the extension arm, the upward retraction of the extension arm upwardly retracting the at least first lid, the upward retraction of the at least first lid upwardly retracting the at least first bait stick cradle, the upward retraction of the at least first bait stick cradle upwardly retracting the at least first bait stick; and
    (i) inspecting the at least first bait stick.

2. The method of claim 1 wherein the embedding step comprises providing an augering machine which is operable from a standing position, operating said machine to auger at least a first monitoring station hole, and inserting the at least first open ended cylindrical housing into the at least first monitoring station hole.

3. The method of claim 2 wherein the at least first open ended cylindrical housing and lid providing steps comprise providing second attaching means adapted for removably attaching the at least first lid to the at least first open ended cylindrical housing, wherein the at least first bait stick cradle inserting step comprises operating the second attaching means to attach the at least first lid to the at least first open ended cylindrical housing, wherein the first attaching means operating step comprises preliminarily connecting the lower end of the extension arm to the at least first lid, wherein the at least first open ended cylindrical housing inserting step comprises downwardly extending the extension arm, the at least first lid, the at least first bait stick cradle, the at least first bait stick, and the at least first open ended cylindrical housing into the at least first monitoring station hole, the first attaching means operating step further comprising subsequently detaching the lower end of the extension arm from the at least first lid.

4. The method of claim 1 wherein the at least first open ended cylindrical housing providing step comprises providing said housing with an open lower end, wherein the at least first bait stick cradle providing step comprises providing said at least first bait stick cradle with an attachable and detachable floor, and wherein the at least first bait stick inserting step comprises upward extension of the at least first bait stick into the at least first bait stick cradle and attaching the attachable and detachable floor to the at least first bait stick cradle.

5. The method of claim 1 further comprising steps of providing a plurality of second open ended cylindrical housings defining a plurality of second interior spaces; embedding the second open ended cylindrical housings within the ground so that their interior spaces open upwardly from the ground; providing a plurality of second lids; providing a plurality of second bait stick cradles, the suspending means further downwardly extending the second bait stick cradles from the second lids; providing a plurality of second bait sticks; inserting the second bait sticks into the second bait stick cradles; inserting the second bait stick cradles downwardly into the second interior spaces; and operating the extension arm to successively retract the second lids and the second bait stick cradles from the second interior spaces; and successively inspecting the second bait sticks.

6. The method of claim 5 wherein the embedding steps comprise providing an augering machine which is operable from a standing position, operating said machine to auger a plurality of monitoring station holes within the ground, and inserting the at least first open ended cylindrical housing and the plurality of second open ended cylindrical housings into the plurality of monitoring station holes.

7. The method of claim 6 wherein the at least first open ended cylindrical housing providing step, the plurality of second open ended cylindrical housings providing step, the at least first lid providing step, and the plurality of second lids providing step comprise providing second attaching means for removably attaching the at least first and plurality of second lids to the at least first and plurality of second open ended cylindrical housings, wherein the at least first bait stick cradle inserting and the second bait stick cradles inserting steps comprise repeatedly operating the second attaching means to attach the at least first and plurality of second lids to the at least first and plurality of second open ended cylindrical housings, wherein the first attaching means operating step further comprises successively and preliminarily connecting the lower end of the extension arm to the at least first and plurality of second lids, wherein the at least first and plurality of second open ended cylindrical housings inserting steps comprise successively downwardly extending the extension arm, the at least first and plurality of second lids, the at least first and plurality of second bait stick cradles, the at least first and plurality of second open ended cylindrical housings, and the at least first and plurality of second bait sticks into the plurality of monitoring station holes.

\* \* \* \* \*